United States Patent [19]
Manoah

[11] Patent Number: 5,549,500
[45] Date of Patent: Aug. 27, 1996

[54] ANIMALIAN FIGURINE

[75] Inventor: Ron Manoah, Dunwoody, Ga.

[73] Assignee: Bob Kennedy, Atlanta, Ga.

[21] Appl. No.: 201,360

[22] Filed: Feb. 24, 1994

[51] Int. Cl.$^6$ .............................. A63H 3/36; A63H 3/02; A01C 1/04
[52] U.S. Cl. .............................. 446/385; 446/372; 47/66; 47/56
[58] Field of Search .................................... 446/385, 386, 446/372; 47/66 B, 78, 80, 84 C, 9, 56

[56] References Cited

U.S. PATENT DOCUMENTS

| | | | |
|---|---|---|---|
| 2,366,377 | 1/1945 | Zois | 47/80 X |
| 2,478,480 | 8/1949 | Greer | 446/385 X |
| 2,537,536 | 1/1951 | Lilienstern | |
| 4,154,174 | 5/1979 | Rees, Jr. et al. | 47/9 X |
| 4,163,343 | 8/1979 | Schoenfield | 446/372 X |
| 4,219,966 | 9/1980 | McCalister | 47/9 |
| 4,662,107 | 5/1987 | Van Den Kieboom | 47/84 C |
| 4,891,905 | 1/1990 | Stolz | 47/71 X |
| 4,950,194 | 8/1990 | Gullace | |
| 5,194,030 | 3/1993 | Le Boeuf et al. | |

FOREIGN PATENT DOCUMENTS

| | | | |
|---|---|---|---|
| 2723435 | 12/1977 | Germany | 47/66 B |
| 2026830 | 2/1980 | United Kingdom | 47/66 B |
| 2257885 | 1/1993 | United Kingdom | 47/67 |

OTHER PUBLICATIONS

Chia Pet–Handmade Decorative Planter., Joseph Enterprises, Inc–®.

Primary Examiner—Robert A. Hafer
Assistant Examiner—D. Neal Muir
Attorney, Agent, or Firm—Kennedy & Kennedy

[57] ABSTRACT

An animalian figurine (10) has an outer covering (11) which contains a body of plant life nutrient material (13) and a bed of plant seeds (14). The plant seeds are positioned adjacent a scalp portion (16) of the covering so that the grass stalks sprouting therefrom grow through a scalp portion to simulate hair.

24 Claims, 1 Drawing Sheet

ANIMALIAN FIGURINE

TECHNICAL FIELD

This invention relates to figurines, and particularly to animalian figurines with live simulated hair.

BACKGROUND OF THE INVENTION

Figurines in the shape of animals have been made for centuries as art objects. These figurines have typically been made of clay, stone or wood. However, while artistically appealing they remain visually and physically static.

Animal figurines have also been designed which have live herbs that simulate the fur or hair of the particular animal. Exemplary of such is those sold by Joseph Enterprises, Inc. of San Francisco, Calif. under the trademark CHIA PET. These figurines have hollow, clay bodies in the general form of the animal represented. A large torso portion of the clay body has many small grooves in which moistened chia seeds (Salvia Columbariae) are positioned. The moistened chia seeds produce a thick, gel-like paste which binds the seeds to the clay surface. However, the appearance of the seed laden, clay body is unsightly prior to the sprouting of the seeds. Also, because the chia sprouts cannot draw nutrients from the hardened clay body they quickly die and become withered and unsightly. Furthermore, the paste-like substance produced by the seeds is susceptible to causing stains upon contact.

Accordingly, it is seen that a need remains for a figurine having plant life which simulates hair that can be continually displayed and cultivated in a clean and aesthetically pleasing manner. It is to the provision of such therefore that the present invention is primarily directed.

SUMMARY OF THE INVENTION

In a preferred form of the invention, a figurine comprises a body of plant life nutrient material, plant seeds in contact with the nutrient material, and a cover about the nutrient material and the plant seeds that includes a portion that is permeable to liquids and plants sprouting from the plant seeds and impermeable to the nutrient material and the plant seeds. With this construction the nutrient material is maintained substantially intact by the covering and the plant seeds may sprout stalks which grow through the portion of the covering to resemble hair.

DETAILED DESCRIPTION

Figure 1:
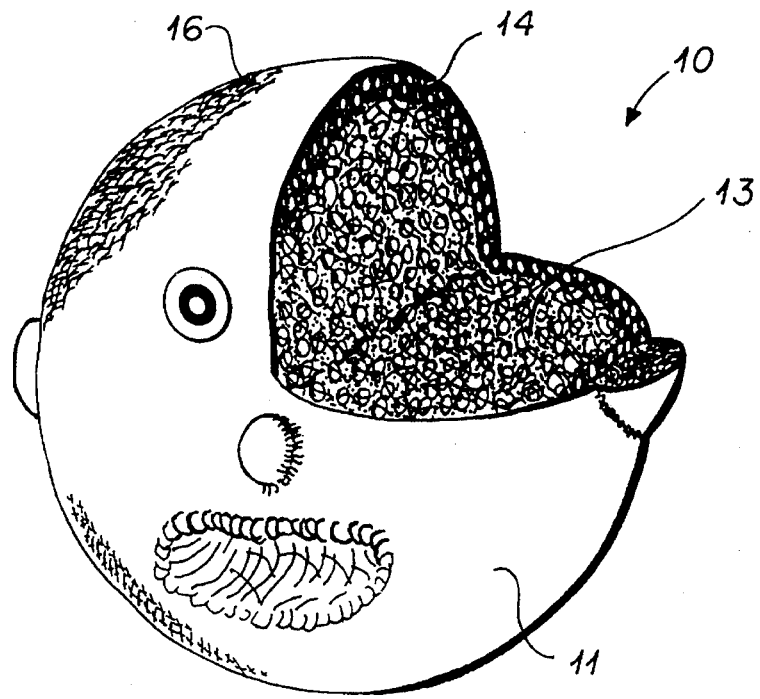
FIG. 1 is a perspective view of a figurine embodying principles of the invention in a preferred form with a portion shown in cross-section.

With reference next to the drawing, there is shown a figurine 10. The figurine 10 has a porous fabric, outer covering 11 preferably made of a knitted nylon, contoured and decorated in a conventional manner to resemble a human face. A mass or body of plant life nutrient material 13, preferably sawdust, and a bed of grass seeds 14, preferably buffalo grass seeds, are contained within the covering 11. The grass seeds 14 are positioned beneath a porous scalp portion 16 of the covering 11. The figurine 10 is positioned upon a shallow, liquid container or basin 18 in fluid communication with liquid contained therein so that the liquid may be drawn into the figurine.

The figurine 10 is manufactured by inverting the covering 11 and positioning the grass seeds within the interior of the covering through an unshown opening in the bottom of the covering 11. The remainder of the interior is filled with sawdust 13 and the opening then closed. The covering has interstices of a size which prevent the permeation of the seeds and sawdust therethrough, yet which allow the permeation of liquids and the stalks of grass. The knit of the covering is also somewhat stretchable to allow the interstices to increase in size as the grass stalks grow. The covering may be configured and decorated to resemble a face before or after it is filled with the seeds and sawdust.

Figure 2:
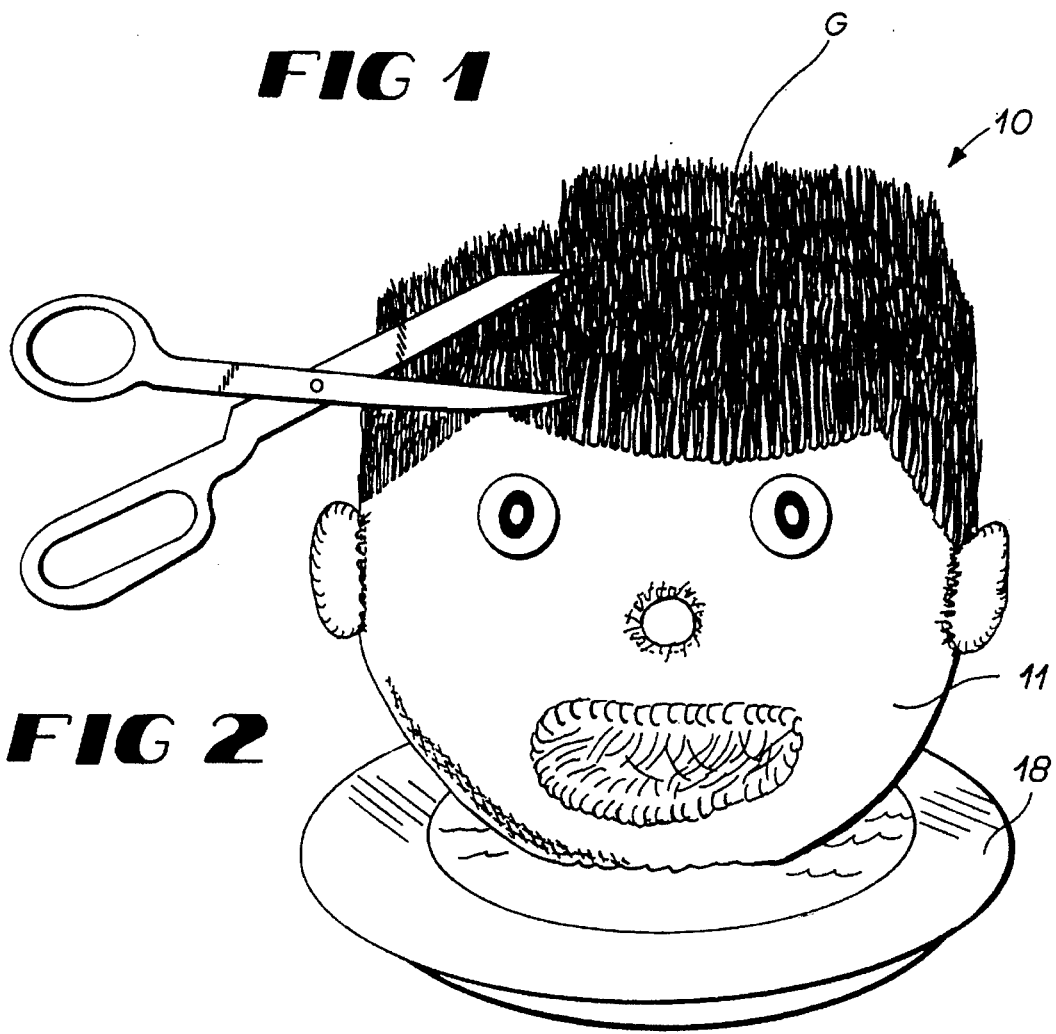
FIG. 2 is a perspective view of the figurine of FIG. 1 shown with stalks of grass extending through the outer covering and being cut to shape.

In use, the figurine 10 is positioned upon the liquid container 18 as shown in FIG. 2. Water is then poured or sprinkled onto the scalp portion 16 of the covering 11 so as to soak through the scalp portion so as to saturate the grass seeds 14 and sawdust 13. Water may also be added directly to the basin 18 to maintain the sawdust moist through capillary-like action of the liquid therethrough. The figurine is placed in an area with sufficient light to promote plant growth.

Within a short period of time the grass seeds germinate causes them to sprout grass stalks G which grow through the interstices of the scalp portion of the covering towards the light. The stalks G have the appearance of hair growing from the scalp portion. The continued growth of the grass stalks causes the interstices to become enlarged to accommodate the stalks.

As shown in FIG. 2, one may then cut the grass stalks to a desired shape or particular hair style. The grass can continue to grow for an extended period of time so long as it is cared for by providing sufficient water and light. Vital nutrients are supplied to the grass by the sawdust.

It should be understood that the figurine may be made in a variety of forms and shapes such as animals. The covering may alternatively be made of a woven nylon or other fibrous material or of a perforated plastic sheet material. The figurine may also be constructed of other material with only the scalp portion 16 comprised of woven material or the like. An internal liquid reservoir may also be used to supply liquid to the nutrient material. The interior of the figurine may be filled with other types of nutrient materials such as soil and peat. Other types of plant seeds may be used as an alternative to grass seeds, such as flower seeds, vegetable seeds and herb seeds.

From the foregoing it is seen that a unique, new product is now provided. It should however be understood that the just described embodiments merely illustrate principles of the invention in its preferred form. Many modifications, additions and deletions may be made without departure from the spirit and scope of the invention as set forth in the following claims.

I claim:

1. An animalian figurine comprising a body of granular plant life nutrient material, plant seeds in contact with said granular nutrient material, and a cover about said granular nutrient material and said plant seeds that includes a mesh portion having interstices of a size substantially permeable to water and plant stalks that may sprout from said plant seeds and substantially impermeable to said granular nutrient material and said plant seeds, whereby with the addition of water the granular nutrient material is maintained substantially intact by the cover and the plant seeds may sprout stalks which grow through the mesh portion of the cover to resemble hair.

2. The animalian figurine of claim 1 wherein said nutrient material is selected from the group consisting of sawdust, soil and peat.

3. The animalian figurine of claim 1 wherein said plant seeds is selected from the group consisting or grass seeds, flower seeds and vegetable seeds.

4. The animalian figurine of claim 1 wherein said mesh cover is selected from the group consisting of woven fibrous material, knitted fibrous material and perforated sheet material.

5. The animalian figurine of claim 2 wherein said plant seeds is selected from the group consisting or grass seeds, flower seeds and vegetable seeds.

6. The animalian figurine of claim 2 wherein said mesh cover is selected from the group consisting of woven fibrous material, knitted fibrous material and perforated sheet material.

7. The animalian figurine of claim 3 wherein said nutrient material is selected from the group consisting of sawdust, soil and peat.

8. The animalian figurine of claim 3 wherein said mesh cover is selected from the group consisting of woven fibrous material, knitted fibrous material and perforated sheet material.

9. A figurine comprising a mixture of granular plant nutrient material and plant seeds, and a cover about said mixture having a mesh portion with interstices sized and shaped to be impermeable to said mixture and permeable to plant stalks sprouting from said seeds, whereby the mixture is maintained substantially intact by the cover and with the addition of water the plant seeds may sprout stalks which grow through the mesh portion to resemble hair.

10. The figurine of claim 9 wherein said nutrient material is selected from the group consisting of sawdust, soil and peat.

11. The figurine of claim 9 wherein said plant seeds is selected from the group consisting or grass seeds, flower seeds and vegetable seeds.

12. The figurine of claim 9 wherein said mesh portion of said cover is selected from the group consisting of woven fibrous material, knitted fibrous material and perforated sheet material.

13. A figurine comprising a cover contoured to resemble a selected figure that includes a selected portion which is substantially permeable to plant stalks and substantially impermeable to plant seeds from which said plant stalks may grow; a granular plant nutrient material contained within said cover; and plant seeds contained within said cover in contact with said granular nutrient material and positioned adjacent said selected portion of said cover, whereby the granular plant nutrient material provides a filling for maintaining the shape of the figurine and for drawing moisture to the seeds through capillary action, and whereby plant stalks sprouting from the plant seeds grow through the selected portion of the cover so as to resemble hair.

14. The figurine of claim 13 wherein said nutrient material is selected from the group consisting of sawdust, soil and peat.

15. The figurine of claim 13 wherein said plant seeds is selected from the group consisting or grass seeds, flower seeds and vegetable seeds.

16. The figurine of claim 13 wherein said cover is selected from the group consisting of woven fibrous material, knitted fibrous material and perforated sheet material.

17. The animalian figurine of claim 1 further comprising water in contact with said granular nutrient material.

18. The animalian figurine of claim 1 further comprising a receptacle for water having an open top and a floor upon which said cover is positioned.

19. The animalian figurine of claim 9 further comprising water in contact with said granular nutrient material.

20. The animalian figurine of claim 9 further comprising a water receptacle having an open top and a floor upon which said cover is positioned.

21. The animalian figurine of claim 13 further comprising water in contact with said granular nutrient material.

22. The animalian figurine of claim 13 further comprising a receptacles for a body of water having an open top and a floor upon which said cover is positioned.

23. A figurine comprising an animated head having a mass of sawdust contained within a cover at least a head scalp portion of which being of a mesh material; plant seeds located beneath said cover scalp portion in contact with said sawdust; and a basin supporting said animated head in which a body of liquid may be held for wetting the sawdust and seeds to enable the seeds to germinate and grow stalks through said cover scalp portion.

24. The figuring of claim 23 wherein said basin has an annular rim resembling a collar below said animated head.

* * * * *